United States Patent Office 2,921,039
Patented Jan. 12, 1960

2,921,039

DIISOCYANATE-CONJUGATED DIOLEFIN FOAM PRODUCT AND METHOD OF PREPARING SAME

John F. McKay, Cranford, and Ober C. Slotterbeck, Clark, N.J., assignors to Esso Research and Engineering Company, a corporation of Delaware No Drawing. Application April 17, 1957
Serial No. 653,300

12 Claims. (Cl. 260—2.5)

The present invention relates to synthetic resinous substances and the production thereof. More particularly, it relates to resins which expand and cure to form resinous foams.

Resinous foams may be used in a variety of ways, such as to give strength to lightweight structural members, act as heat insulators, etc. They are generally prepared by reacting di-isocyanate with a polyester to form a cross-linked polymer and simultaneously evolve carbon dioxide. The reaction must be executed with precision in order to realize efficient yield of gas at a time when the viscosity of the polymer will permit trapping of the gas in bubbles of desired size.

It has now been found that rigid resinous foams may be prepared with liquid polymers, obtained by polymerizing a conjugated diolefin having 4 to 6 carbon atoms, or copolymerizing such a diolefin with a vinyl aromatic or alkyl cyclic compound, by introducing oxygen-containing groups into the polymer prior to reacting it with the isocyanate. Polymers which have not been treated to incorporate oxygen will not react to form foams.

Furthermore, it has been found that the foams produced with these oxygen-containing liquid polymers absorb relatively little water, a property which makes them useful where the exclusion of moisture is desirable, for instance in life preservers and boats.

The synthetic oils to which the present invention is applicable are polymers of butadiene, isoprene, dimethyl butadiene, piperylene, methyl pentadiene or other acyclic conjugated diolefins having four to six carbon atoms per molecule. Instead of polymerizing any of the aforesaid diolefins alone, they may be copolymerized in admixture with each other or in admixtures with monomers copolymerizable therewith, e.g., an at least partially unsaturated cyclic compound having a $C_1$ to $C_2$ side chain, such as a vinyl or methyl group, attached to the ring. Suitable cyclic compounds include toluene, styrene, styrenes having alkyl groups substituted on the ring, such as methyl styrene, etc. Also similar amounts of acrylonitrile, methacrylonitrile, methyl acrylate, methyl methacrylate, vinyl isobutyl ether, and methyl vinyl ketone may be employed. Such synthetic oils may be advantageously prepared in the presence of an alkali metal, such as sodium, when the monomers consist of a diolefin or of a mixture of an acyclic diolefin with a cyclic compound. Where the copolymer is styrene-butadiene it is preferred to use about 15 to 25 wt. percent of styrene and about 75 to 85 wt. percent butadiene-1,3 in preparing the polymer oil. The preferred polymers are those prepared by polymerizing diolefins in the presence of organic compounds containing an at least partially unsaturated ring having a methyl group attached thereto. According to this process the polymerization is carried out in the presence of an ether and an alkali metal catalyst, as described in copending application Ser. No. 624,824, filed November 28, 1956.

The polymerization may be conducted in the presence of an alkali metal catalyst at a temperature between about 0 and 150° C. A suitable method, employing sodium as the catalyst is as follows: 80 parts of butadiene-1,3, 20 parts of styrene, 200 parts of straight run mineral spirits boiling between about 300 and 400° F., such as Varsol which contains about 30 vol. percent aromatics, 37 vol. percent naphthenics and 33 vol. percent paraffins, 40 parts of dioxane, 0.2 parts of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide, acetic acid, sulfuric acid or other acid and filtered. Instead of neutralizing the alcohol treated product, the acid may be added directly to the crude product.

The colorless filtrate is then fractionally distilled to remove the alcohol and modifiers such as dioxane. Finally, additional hydrocarbon solvent is preferably distilled off until a product containing about 40 to 100% non-volatile matter (NVM) is obtained.

Again it will be understood that the described sodium polymerization method may be varied considerably, as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or ethylal; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of catalyst. Furthermore, the mineral spirits may be replaced by other inert hydrocarbon diluents boiling between about —15° C. and 200° C., preferably between 60 and 200° C., e.g. butane, benzene, xylene, naphtha, cyclohexane and the like. The diluents are usually used in amounts ranging from 50 to 500 parts per 100 parts of monomer. The reaction temperature should be between about 40° C. and 100° C., preferably around 65 to 85° C. As a catalyst, 0.1 to 10 parts of dispersed alkali metal is used per 100 parts of monomers, catalyst particle sizes below 100 microns, preferably about 5 to 50 microns, being particularly effective. The polymers produced by the above processes are viscous liquids and have viscosities from less than 1 up to about 22 poises at 25° C. and 50% non-volatile matter which corresponds to about 1,000 to 20,000 poises at 100% non-volatile matter. Alternately, polymers prepared by polymerizing 15 to 95 or 100 wt. percent of a hydrocarbon olefin containing 4 to 10 carbon atoms in the presence of about 0.01 to 10 parts by weight of an alkali metal catalyst such as sodium, potassium rubidium, cesium, etc. about 0 or 5 to 75 wt. percent of a methyl containing cyclic organic compound, such as a methyl aromatic, a methyl dicyclohydrocarbon or a methyl heterocyclic compound and about 1 to 200 parts by weight of an ether selected from the group consisting of tetrahydrofuran, tetrahydropyran, methylal and dimethyl ether, may be employed. Suitable methyl-containing cyclic organic compounds include xylene, toluene, ethyl toluene, trimethyl benzene, methyl naphthalene, methyl methano indene, alpha methyl pyridine, 2,4-dimethyl pyridine, etc. These polymerizations are generally carried out at a temperature between about 0 and 150° C. The polymers may have a viscosity between about 0.05 and 5000 poises at 25° C. and 100% NVM. Therefore the polymers falling within the scope of this invention may have a viscosity of from about 0.05 to about 20,000 depending on how they are prepared and what monomers are employed.

The oxidation treatment used in one embodiment of this invention is best carried out in the presence of a solvent, although the lower viscosity polymers may be oxidized in the absence of a solvent. Examples of suitable solvents include hydrocarbons having boiling points up to about 200° C. A particularly suitable solvent is a mineral spirit having an aromatic content of about 50% or more, or an aromatic solvent, e.g. benzene, toluene, etc.

Catalysts suitable for the oxidation reaction of this invention include organic salts of metals, such as the naphthenates, octoates and other hydrocarbon soluble metal salts of cobalt, lead, iron and manganese. These catalysts are used in small amounts. Peroxides, such as benzoyl peroxide and the like, may be added to reduce the induction period.

In practicing this specific embodiment, polymer oil, say a copolymer oil composed of 80 wt. percent butadiene and 20 wt. percent styrene, is charged into a vertical tank having, near the bottom thereof, a porous thimble or distributing plate. Oxygen-containing gas, e.g. air or oxygen, is contacted with the polymer by bubbling it through the oil solution, containing 65% by weight solvent at a moderate rate for about 1 to 2 hours at a temperature between about 20 and 150° C., preferably between 100 and 130° C. A polymer oil containing about 0.05 to 20 wt. percent combined oxygen is recovered. The polymer oils which are most suitable for the purpose of this invention contain a substantial amount of oxygen, that is, from about 5 wt. percent up to about 20 wt. percent.

It is understood that conditions of temperature and time of reaction, ratio of reactants, degree of dilution, presence or lack of solvents, and the like, will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent to which the oxidation is carried. The degree or extent of oxidation in turn depends on various factors including time of oxidation, temperature, presence or absence of catalysts, type of solvent, etc. In general, a greater extent of oxidation results in less solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents, but is soluble in aromatic solvents indicating that the oxidation has proceeded to a high degree. The percent of oxygen in the product will vary according to the conditions employed from a trace to about 20% or more.

The oxygen-containing polymer oil should be stripped of any solvent present so that it consists principally of non-volatile matter before reacting it with the di-isocyanate. If substantial amounts of volatile matter are present during the foaming stage, they will form large pockets in the foam.

According to the present invention, the oxygen-containing polymer oil is contacted with a di-isocyanate which reacts with it and produces a polymer having considerable cross-linking while simultaneously producing a gas which forms bubbles in the polymer as the foam cures and becomes rigid. The volume and specific gravity of the foam may be controlled by varying the temperature, reaction time and the use or non-use of a blowing agent. Typical foams produced according to the present invention have specific gravities of from less than about 0.1 to about 0.4.

The amount of di-isocyanate employed should be between about 1 and 25 parts by weight per 100 parts by weight of oxidized polymer. However, it is preferred to use between about 5 and 20 parts of an organic di-isocyanate. Suitable di-isocyanates include m-tolylene di-isocyanate, p,p'-di-isocyanatodiphenylmethane, etc.

If a low density, high volume rigid foam is desired, blowing agents, such as N,N'-dimethyl-N,N'dinitroso terephthalamide or oxy bis benzene sulfonyl hydrazide, which release gas when heated may be employed in amounts ranging between about 1 and 25 parts by weight per 100 parts of polymer, preferably about 5 to 15 parts per 100 parts of polymer.

The reaction and curing temperatures should be between about 100° and 250° C. However, it is better to contact the components at temperatures between about 120 and 180° C. The reaction time varies with the temperature employed, but in general it requires from a few minutes up to about 20 hours to form a satisfactory rigid foam, although it is better to use shorter periods of time, that is, about 10 minutes to 1 hour.

Inert fillers, such as clays, asbestos, carbon black, whiting, colored pigments, etc., may be added to the polymers before foaming to increase final strength and reduce costs. These may be used between about 1 and 50 parts per 100 parts of polymer.

The following examples are given to allow a better understanding of the invention. However, it is not intended that the invention be limited to them.

EXAMPLE 1

A polymer oil having a molecular weight of about 600, prepared by polymerizing 120 parts by weight of 1,3-butadiene with 150 parts by weight of Solvesso 100, a hydrocarbon liquid containing over 96 wt. percent of methylated aromatics, and boiling between 160 and 175° C., for 18 hours at 50° C. in the presence of 50 parts by weight of tetrahydrofuran and 2 parts by weight of finely divided sodium catalyst was stripped of solvent and blown with oxygen at 105° C. in the presence of 0.01% manganese in the form of manganese naphthenate, until it contained 7.2 weight percent of oxygen. The Gardner viscosity was 54 poises at 100% NVM. Several 10 gram portions were placed in 3 oz. cans and mixed with tolylene di-isocyanate and/or a blowing agent, oxy bis benzene sulfonyl hydrazide and cured for 30 minutes in an oven at 130° C. The results of the experiments are set forth in Table I.

*Table I*

| Run No. | Composition | Product |
|---|---|---|
| 1 | 100 parts polymer | Liquid. |
| 2 | 100 parts polymer + 5 parts blowing agent. | Soft, sticky gel, no foam. |
| 3 | 100 parts polymer + 13 parts di-isocyanate. | Semi-brittle foam. Volume increased 5 times. |
| 4 | 100 parts polymer + 13 parts di-isocyanate + 5 parts blowing agent. | Semi-brittle foam. Volume increased 11 times. |

When runs 3 and 4 were left in the oven at 130° C. overnight they became hard, black, resinous foams.

EXAMPLE 2

A series of experiments was undertaken with a polymer oil prepared according to Example 1, except that toluene was used instead of Solvesso 100. Portions of the polymer were blown with oxygen in the same way until they had oxygen contents of 6.2 or 9.2 wt. percent. Various amounts of tolylene di-isocyanate and oxy bis benzene sulfonyl hydrazide were then used to make resinous foams. Each mixture was placed in a 4" x 4" x 1¼" steel mold lined with Holland cloth which was put between the platens of a Preco Press and held for 1 hour at 163° C. The foam pads were then removed from the mold and further cured in a circulating air oven at 163° C. for 18 hours. Each foam was cut into square inch blocks and its compressive strength measured in a Tinium-Olsen tester. For comparative purposes, the foams prepared according to the present invention are compared with compressive strength data obtained with a commercial foam-in-place liquid resin foam.

Table II

| Run No. | Oxygen Content of Polymer, Percent Polymer | Parts of Di-Isocyanate Per 100 Parts Polymer | Parts of Blowing Agent Per 100 Parts Polymer | Specific Gravity of Foam | Bulk Density of Foam (lbs./cu. ft.) | Compressive Strength (lbs./sq. in.) | Commercial Foam Compressive Strength (lbs./sq. in.) |
|---|---|---|---|---|---|---|---|
| 5 | 6.2 | 15 | 5 | 0.36 | 22.5 | 1,100 | 1,025 |
| 6 | 6.2 | 10 | 15 | 0.28 | 17.5 | 925 | 750 |
| 7 | 9.2 | 5 | 5 | 0.25 | 15.5 | 600 | 650 |
| 8 | 9.2 | 5 | 5 | 0.13 | 8 | 240 | 220 |
| 9 | 9.2 | 10 | 10 | 0.11 | 7 | 170 | 200 |

EXAMPLE 3

The following study was conducted to illustrate the low water absorption properties of this new foam. A 2.5 gram block of run No. 6 in Example 2 was weighed and then immersed in water for 4 days, at the end of which time the excess water was blotted off and the block reweighed. It was found that the gain in weight, based on the original foam weight, was 20%, while a commercial polyurethane foam, having a bulk density of 2 lbs./cu. ft., gained 75% in weight after being immersed in water for only 2 days. These data indicate the foams prepared according to the present invention have a non-interconnecting cellular structure.

It is not intended that the present invention be limited to the specific conditions employed in the examples, but rather it is understood that resort may be had to various conventional modifications without departing from the spirit of the invention or the scope of the appended claims.

What is claimed is:

1. A method for preparing a rigid foam which comprises reacting 100 parts of an oxidized drying oil with 1 to 25 parts of an organic diisocyanate, whereby a gas is evolved forming a foam, and curing the foam therefrom at a temperature between about 100° and 250° C.; said drying oil being prepared by polymerizing a $C_4$ to $C_6$ conjugated diolefin in the presence of an alkali metal catalyst, and by oxidizing said drying oil by air blowing to incorporate 5 to 20 weight percent oxygen in the structure.

2. A method for preparing a rigid foam which comprises reacting 100 parts of an oxidized drying oil with 1 to 25 parts of an organic diisocyanate, whereby a gas is evolved forming a foam, and curing the foam therefrom at a temperature between about 100° and 250° C.; said drying oil being prepared by polymerizing a $C_4$ to $C_6$ conjugated diolefin with a partially unsaturated cyclic compound having a vinyl group attached to the ring selected from the group consisting fo styrene and an alkyl styrene in the presence of an alkali metal catalyst, and by oxidizing said drying oil by air blowing to incorporate 5 to 20 weight percent oxygen in the structure.

3. A method for preparing a rigid foam which comprises reacting 100 parts of an oxidized drying oil with 1 to 25 parts of an organic diisocyanate, whereby a gas is evolved forming a foam, and curing the foam therefrom at a temperature between about 100° and 250° C.; said drying oil being prepared by polymerizing butadiene with styrene in the presence of an alkali metal catalyst, and by oxidizing said drying oil by air blowing to incorporate 5 to 20 weight percent oxygen in the structure.

4. A method for preparing a rigid foam which comprises reacting 100 parts of an oxidized drying oil with 1 to 25 parts of an organic diisocyanate selected from the group consisting of m-tolylene diisocyanate and p,p'-diisocyanatiodiphenylmethane, whereby a gas is evolved forming a foam, and curing the foam therefrom at a temperature between about 100° and 250° C.; said drying oil being prepared by polymerizing a $C_4$ to $C_6$ conjugated diolefin in the presence of an alkali metal catalyst, and by oxidizing said drying oil by air blowing to incorporate 5 to 20 weight percent oxygen in the structure.

5. A method for preparing a rigid foam which comprises reacting 100 parts of an oxidizing drying oil with 1 to 25 parts of an organic diisocyanate and a blowing agent selected from the group consisting of oxy bis benzene sulfonyl hydrazide and N,N'-dimethyl-N,N' dinitroso terephthalamide, whereby a gas is evolved forming a foam, and curing the foam therefrom at a temperature between about 100° and 250° C.; said drying oil being prepared by polymerizing a $C_4$ to $C_6$ conjugated diolefin and in the presence of an alkali metal catalyst, and by oxidizing said drying oil by air blowing to incorporate 5 to 20 weight percent oxygen in the structure.

6. A method for preparing a rigid foam which comprises reacting 100 parts of an oxidized drying oil with 1 to 25 parts of an organic diisocyanate and oxy bis benzene sulfonyl hydrazide, whereby a gas is evolved forming a foam, and curing the foam therefrom at a temperature between about 100° and 250° C.; said drying oil being prepared by polymerizing a $C_4$ to $C_6$ conjugated diolefin in the presence of an alkali metal catalyst, and oxidizing said drying oil by air blowing to incorporate 5 to 20 weight percent oxygen in the structure.

7. A method for preparing a rigid foam which comprises reacting 100 parts of an oxidized drying oil with about 1 to 25 parts by weight of m-tolylene diisocyanate and about 1 to 25 parts by weight of oxy bis benzene sulfonyl hydrazide, whereby a gas is evolved forming a foam, and curing the foam therefrom at a temperature between about 100° and 250° C.; said drying oil being a polymer selected from the group consisting of the homopolymer of butadiene and the copolymer of butadiene with styrene prepared in the presence of a sodium catalyst, and oxidizing said drying oil by air blowing to incorporate 5 to 20 weight percent oxygen in the structure.

8. A rigid foam comprising a reaction product of 1 to 25 parts of an organic diisocyanate and 100 parts of an air blown polymeric drying oil containing 5 to 20% oxygen in its structure, said drying oil being a polymer of a $C_4$ to $C_6$ conjugated diolefin.

9. A rigid foam comprising a reaction product of 1 to 25 parts of an organic diisocyanate and 100 parts of an air blown polymeric drying oil containing 5 to 20% oxygen in its structure, said drying oil being a polymer of a $C_4$ to $C_6$ conjugated diolefin with a partially unsaturated cyclic compound having a vinyl group attached to the ring selected from the group consisting of styrene and an alkyl styrene.

10. A rigid foam comprising a reaction product of 1 to 25 parts of an organic diisocyanate and 100 parts of an air blown polymeric drying oil containing 5 to 20% oxygen in its structure, said drying oil being a copolymer of butadiene with styrene.

11. A rigid foam comprising a reaction product of 1 to 25 parts of an organic diisocyanate selected from the group consisting of m-tolylene diisocyanate and p,p''-diisocyanate-diphenylmethane and 100 parts of an air blown polymeric drying oil containing 5 to 20% oxygen in its structure, said drying oil being a polymer of a $C_4$ to $C_6$ conjugated diolefin selected from the group consisting of the homopolymer of butadiene and the copolymer of butadiene with styrene.

12. A rigid foam comprising a reaction product of 100 parts of an air blown polymeric drying oil containing 5 to 20% oxygen in its structure, 1 to 25 parts of an organic diisocyanate and a blowing agent selected from the group consisting of oxy bis benzene sulfonyl hydrazide and N,N'-dimethyl-N,N' dinitroso terephthalamide and said drying oil being a polymer of a $C_4$ to $C_6$ conjugated diolefin.

References Cited in the file of this patent

UNITED STATES PATENTS

| 2,740,743 | Pace | Apr. 3, 1956 |
| 2,830,083 | Stempel | Apr. 8, 1958 |

FOREIGN PATENTS

| 852,882 | Germany | Oct. 20, 1952 |
| 895,831 | Germany | Nov. 5, 1953 |